(12) United States Patent
Sinz

(10) Patent No.: US 7,082,931 B2
(45) Date of Patent: Aug. 1, 2006

(54) FUEL MODULE

(75) Inventor: Wolfgang Sinz, Sulzbach (DE)

(73) Assignee: Siemens Aktiengesellschaft, Munich (DE)

( * ) Notice: Subject to any disclaimer, the term of this patent is extended or adjusted under 35 U.S.C. 154(b) by 151 days.

(21) Appl. No.: 10/488,805

(22) PCT Filed: Sep. 6, 2002

(86) PCT No.: PCT/DE02/03331

§ 371 (c)(1),
(2), (4) Date: Mar. 4, 2004

(87) PCT Pub. No.: WO03/023218

PCT Pub. Date: Mar. 20, 2003

(65) Prior Publication Data

US 2004/0237941 A1   Dec. 2, 2004

(30) Foreign Application Priority Data

Sep. 6, 2001   (DE) ............................... 101 43 819

(51) Int. Cl.
*F02M 37/04* (2006.01)
(52) U.S. Cl. ...................................... 123/509; 123/514
(58) Field of Classification Search ................ 123/509, 123/514
See application file for complete search history.

(56) References Cited

U.S. PATENT DOCUMENTS

| 4,770,150 A | | 9/1988 | Fraenkle et al. |
| 5,363,827 A | * | 11/1994 | Siekmann .................... 123/509 |
| 5,732,684 A | | 3/1998 | Thompson |
| 5,913,294 A | * | 6/1999 | Takahashi et al. .... 123/198 DB |
| 6,619,272 B1 | * | 9/2003 | Jones et al. ................. 123/514 |

FOREIGN PATENT DOCUMENTS

| DE | 42 42 242 A1 | 6/1994 |
| DE | 44 25 670 A1 | 1/1996 |
| DE | 195 09 143 A1 | 9/1996 |
| DE | 199 32 356 A1 | 2/2000 |
| DE | 198 46 616 A1 | 4/2000 |
| DE | 44 25 670 C2 | 8/2000 |
| DE | 100 03 748 A1 | 8/2001 |
| FR | 0 798 457 B1 | 11/2001 |
| GB | 2 356 177 A | 11/1999 |

* cited by examiner

*Primary Examiner*—Thomas Moulis
(74) *Attorney, Agent, or Firm*—Richard A. Speer; Mayer, Brown, Rowe & Maw, LLP

(57) ABSTRACT

The invention relates to a fuel module for the introduction of fuel from a fuel tank 91) to an internal combustion engine, comprising a supply pump (9), through which fuel is taken up and supplied to a container (2) and a main pump (3), which takes up fuel from the container (2) and supplies the internal combustion engine at high pressure. The supply pump (9) is a low-pressure pump, the outlet of which feeds into the container (2) through a fine filter (11).

14 Claims, 1 Drawing Sheet

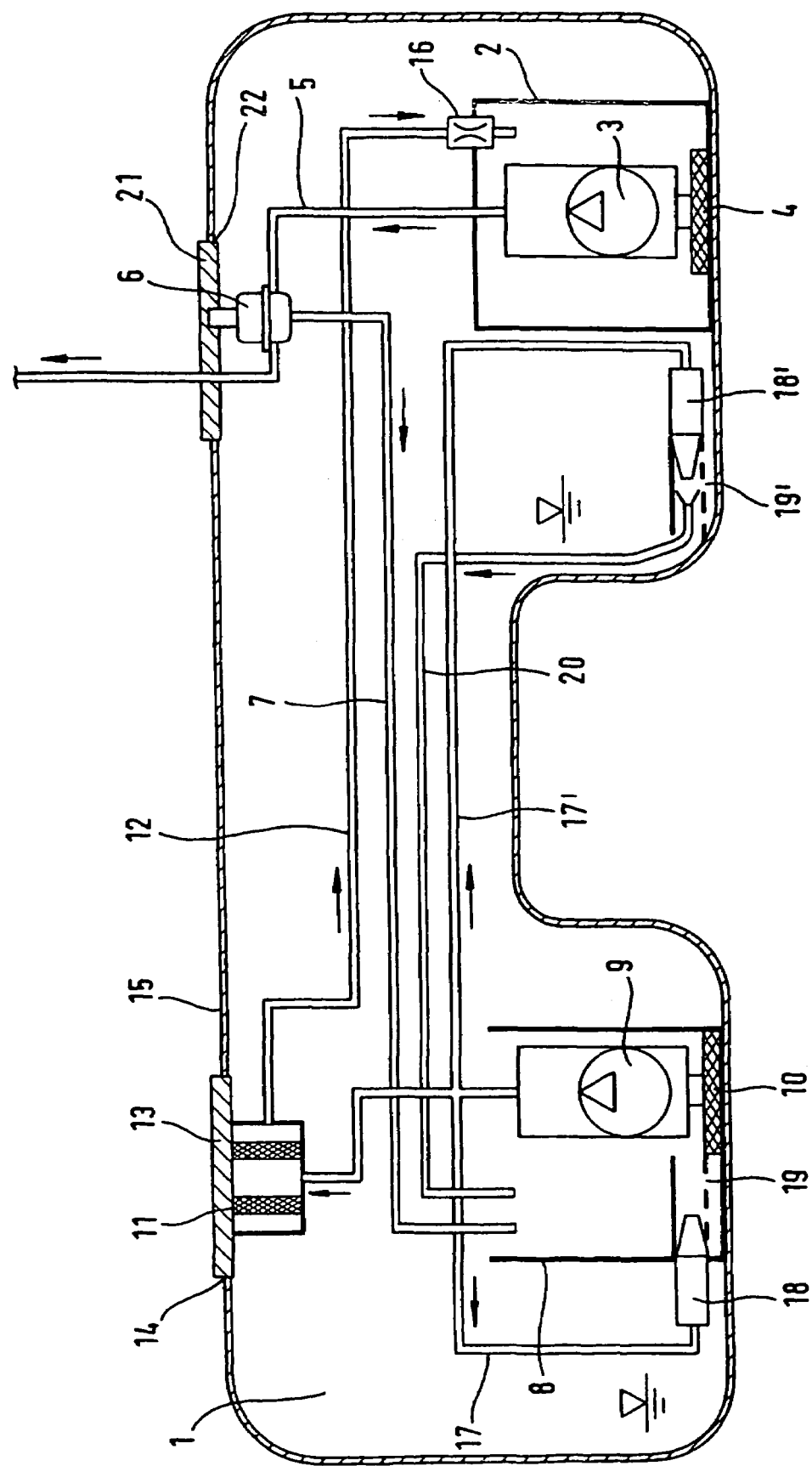

FUEL MODULE

BACKGROUND OF THE INVENTION

The invention is concerned with a fuel module for supplying fuel from a fuel tank to an internal combustion engine, having a feed pump which is used to take up fuel and feed it into a container, and having a main pump which takes up fuel from the container and supplies it at high pressure to the internal combustion engine, the feed pump being a pump which feeds at a low pressure and the pump outlet of which leads into the container via a fine filter.

In fuel modules of this type, it is known to arrange a fine filter in the line leading from the outlet of the main pump to the internal combustion engine. Although coarse filters are also frequently arranged on the main pump intake duct, these can only filter out particles from the fuel which are larger than approximately 40 to 100 μm. Smaller particles pass through the main pump and are filtered out only in the fine filter. This leads to problems if the moveable components of the main pump are arranged in the fixed components with only a small amount of play, so that gaps of the order of magnitude of only 10 to 20 μm are present between these components. These small gaps may become clogged up or damaged by the dirt particles which have passed through the coarse filter, with the result that the functioning of the main pump is impaired.

The replacement of the coarse filter on the main pump intake duct by a fine filter could be undertaken only with very large filter elements, since the soiling capacity which is possible over the lifetime of a motor vehicle would have to be in the region of several grams in order to ensure that the filter still allows a sufficient amount of flow to pass through it.

Since the suction action of the main pump is relatively small and lies in the region of only a few millibars, even with little soiling of the filter this suction action is no longer sufficient in order to take fuel into the pump to a sufficient extent, and so evaporation of the fuel in the fine filter occurs and thereby results in the pump having hot feeding problems which interfere with the functioning of the pump or even render it completely incapable of functioning.

DE-A-44 25 670 discloses a fuel module of the type mentioned at the beginning.

U.S. Pat. No. 47 70 150 discloses a fuel module for supplying fuel from a fuel tank to an internal combustion engine, the module having a feed pump which is used to take up fuel. The fuel is fed by the feed pump via a heat exchanger, a main filter and a fine filter to the injection pump of the internal combustion engine.

DE-A-198 46 616 discloses a fuel module for feeding fuel from a fuel tank to an internal combustion engine, the module having a feed pump which takes up fuel via a first filter and feeds it into a container. Fuel is taken up from the container via a fine filter by a main pump and supplied to the internal combustion engine.

It is the object of the invention to provide a fuel module of the type mentioned at the beginning which enables the use of main pumps of small dimensions, the functioning of which is ensured over their lifetime and in which there is no drop over the lifetime in the feed quantity of the fuel supplied to the internal combustion engine.

This object is achieved according to the invention by the fact that the container is a closed container in which the main pump is arranged.

BRIEF DESCRIPTION OF THE INVENTION

The feed pump is used to feed large circulating quantities of fuel through the fine filter at relatively low pressures. The feed pump pressure acting on the fine filter is much larger than a possible negative suction pressure which can be produced by the feed pump, so the flow passes without any problem through the fine filter. Evaporations of the fuel in the fine filter do not lead to hot feeding problems in the main pump. The fuel which has already been finely filtered makes it possible to use a main pump, which is designed as a flow pump and has small gap sizes between the moveable and fixed parts, the main pump producing the required high pressure in spite of its small size and being protected against wear by dirt particles.

There is no drop in pressure through a fine filter arranged downstream of the main pump in the direction of flow, and so the pressure produced by the main pump is also fully maintained to feed the fuel on further.

The closed container prevents, when the fuel tank is at least largely filled, unfiltered fuel from being able to pass into the container and impair the functioning of the main pump.

In order to simplify the assembly, the main pump is arranged in the container.

Since the feed pump does not have to produce any high pressures, it can be designed as a flow pump having relatively large gap sizes between the moveable and fixed parts, which means that the dirt particles contained in the fuel do not impair the full functioning capability of the feed pump.

In this case, the feed pump can produce a feed pressure of approximately 400 mbar to approximately 600 mbar, preferably of approximately 500 mbar.

If the feed pump takes up fuel via a filter, it is also adequately protected against the wear by dirt particles.

In order to ensure a sufficient quantity of fuel at the feed pump, the feed pump can take up fuel from a feed pump container into which fuel is fed from the fuel tank by one or more suction jet pumps.

If a branch flow of the feed flow is supplied here from the pump outlet of the feed pump to the suction jet pump or suction jet pumps as operating flow, then the main pump can be dimensioned exclusively for the quantity of fuel which is to be fed to the internal combustion engine. In this case, the branch flow can be branched off from the feed flow both upstream and downstream of the fine filter. The advantage of it branching off upstream of the fine filter is that the suction jet pump is more powerful.

So that a sufficient pressure is built up by the feed pump in order to be able to operate the suction jet pump reliably, a restrictor against the resistance of which the feed pump has to feed can be arranged in the pump outlet of the feed pump, said outlet leading to the container, the restrictor preferably being arranged downstream of the fine filter in the direction of flow in the pump outlet. The pressure at the feed pump is then further increased and results in a further improvement in the feeding activity of the suction jet pump if the throughflow resistance of the fine filter is increased over the course of its lifetime by the dirt particles which have been filtered out.

A construction which can be preassembled in a simple manner results if the feed pump is arranged in the feed pump container.

A pressure regulator which is used to determine the maximum pressure supplied to the internal combustion engine can be arranged in the feed line leading from the main pump to the internal combustion engine.

If the cut-off line of the pressure regulator is guided here into the feed pump container, it does not have to be fed once again from the suction jet pump into the feed pump container, and the necessary power of the suction jet pump can be restricted to the use of the internal combustion engine.

If the main pump takes up fuel from the container via a further filter, then residual dirt which is also still possible is kept away from the main pump by this filter.

Likewise to simplify assembly, the main pump can be arranged in the container.

BRIEF DESCRIPTION OF THE DRAWING

An exemplary embodiment of the invention is illustrated in the drawing and will be described in greater detail below. The single FIGURE of the drawing shows a diagrammatic construction of a fuel module which is installed in a fuel tank.

The fuel tank 1 is a "saddle tank", the two tank regions of which are connected to each other. Arranged in a closed container 2 in the right-hand tank region is a main pump 3 which is designed as a flow pump, takes up fuel from the container 2 via a filter 4 of small filtering force and feeds it via a feed line 5 at high pressure to an internal combustion engine (not illustrated).

A pressure regulator 6 which is fastened to a closure 21 of the tank opening 22 in the upper wall 15 of the fuel tank 1 is arranged in the feed line 5 and its cut-off line 7 is guided into an upwardly open feed pump container 8 which is arranged in the left-hand tank region.

The feed pump 9 is arranged in the feed pump container 8, the feed pump being designed as a flow pump, taking up fuel from the feed pump container 8 via a filter 10 of small filtering force and pumping it at a feed pressure of approximately 500 mbar in a supply line 12 to the container 2. A fine filter 11 is first of all arranged in the supply line 12 in the feeding direction, said fine filter being situated on a closure 13 of a tank opening 14 in the upper wall 15 of the fuel tank 1. In the direction of flow downstream of the fine filter 11, a restrictor 16 is arranged in the supply line 12 at the point at which it opens into the container 2, the restrictor ensuring that a certain pressure is built up in the supply line 12 by the feed pump 9.

Two branch lines 17, 17' lead off from the supply line 12 upstream of the fine filter 11 and are used to guide branch flows of the feed flow of the feed pump 9 to suction jet pumps 18, 18' and to drive the latter. The suction jet pumps 18, 18' take up fuel from the fuel tank 1 via suction openings 19, 19' and feed it together with the fuel of the branch flows of the feed flow of the feed pump 9 into the feed pump container 8 directly (suction jet pump 18) or via a feed line 20 (suction jet pump 18').

The invention claimed is:

1. A fuel module for supplying fuel from a fuel tank (1) to an internal combustion engine, having a feed pump 9 which is used to take up fuel from an open feed pump container 8 and feed it into a container (2), and having a main pump (3) which takes up fuel from the container (2) and supplies it at high pressure via feed line (5) to the internal combustion engine, the feed pump being a pump which feeds at a low pressure and the pump outlet of which leads into the container (2) via a fine filter (11), characterized in that the container (2) is a closed container in which the main pump (1) is arranged.

2. The fuel module as claimed in claim 1 characterized in that the feed pump (9) is a dynamic pump.

3. The fuel module as defined in claim 2 characterized in that the feed pump (9) produces a feed pressure of approximately 400 mbar to approximately 600 mbar.

4. The fuel module as claimed in claim 3, characterized in that the feed pump (9) produces a feed pressure of approximately 500 mbar.

5. The fuel module as defined in claim 1, characterized in that the feed pump (9) takes up fuel via a filter (10).

6. A fuel module for supplying fuel from a fuel tank (1) to an internal combustion engine, the fuel tank having two interconnected fuel storage regions, a closed container 2 in one of the fuel storage regions, a main pump 3 located inside container 2 for delivering fuel from the container 2 to the internal combustion engine, an open feed pump container 8 located within the other of the two interconnected fuel storage regions, a feed pump 9 located inside container 8 for delivering fuel from the container 8 to the interior of sealed container 2 via a fine filter (11), and means for supplying fuel from both of the fuel storage regions of the fuel tank (1) into the feed pump container 8.

7. A fuel module as defined in claim 6, wherein jet pumps located in each of the two fuel storage regions feed fuel from both storage regions into the feed pump container 8.

8. The fuel module as claimed in claim 7, characterized in that a branch flow from the outlet of the feed pump (9) is supplied to the suction jet pump or suction jet pumps (18, 18') as operating flow.

9. The fuel module as claimed in claim 8, characterized in that a restrictor (16) is arranged in the pump outlet of the feed pump (9), said outlet leading to the container (2).

10. The fuel module as claimed in claim 9, characterized in that the restrictor (16) is arranged downstream of the fine filter (11) in the direction of flow in the pump outlet.

11. The fuel module as defined in claim 6, characterized in that the feed pump (9) is arranged in the feed pump container (8).

12. The fuel module as defined in claim 1, characterized in that a pressure regulator (6) is arranged in the feed line (5) leading from the main pump (3) to the internal combustion engine.

13. The fuel module as claimed in claim 12, characterized in that a cut-off line (7) of the pressure regulator (6) is guided into the feed pump container (8).

14. The fuel module as defined in claim 1, characterized in that the main pump (3) takes up fuel from the container (2) via a filter (4).

* * * * *